United States Patent [19]

Brooks

[11] Patent Number: 4,976,334

[45] Date of Patent: Dec. 11, 1990

[54] NOISE REDUCING TOOL AND METHOD

[75] Inventor: Gary E. Brooks, New Glasgow, Canada

[73] Assignee: Bombardier, Inc., Montreal, Canada

[21] Appl. No.: 446,057

[22] Filed: Dec. 5, 1989

[51] Int. Cl.$^5$ .............................................. F16F 15/00

[52] U.S. Cl. .................................... 181/207; 181/208; 181/290; 181/296; 269/900

[58] Field of Search ................................ 181/207–209, 181/290, 296; 269/151, 900; 188/379, 380

[56] References Cited

U.S. PATENT DOCUMENTS

| | | | |
|---|---|---|---|
| 2,424,004 | 7/1947 | Terrell | 181/208 |
| 2,541,159 | 2/1951 | Geiger | 181/207 |
| 3,016,971 | 1/1962 | McPherson II | 181/207 |
| 3,160,549 | 12/1964 | Caldwell et al. | 427/317.3 |
| 3,207,503 | 9/1965 | Clover, Jr. et al. | 269/151 X |
| 3,876,034 | 4/1975 | Antonini | 181/207 |
| 4,023,651 | 5/1977 | Healiss | 181/207 X |
| 4,353,433 | 10/1982 | Morenstein-Entel et al. | 181/207 |
| 4,516,658 | 5/1985 | Scanton et al. | 181/208 |

FOREIGN PATENT DOCUMENTS 1034610 7/1978 Canada .

*Primary Examiner*—Benjamin R. Fuller
*Attorney, Agent, or Firm*—Fisher, Christen & Sabol

[57] ABSTRACT

The present noise reduction system provides a tool and a method to dampen the vibration of sheet material such as a panel, a metal sheet or a skin while performing a manufacturing operation on it, for instance riveting, drilling, etc. This noise reducing tool is held in place by vacuum and thus avoids the disadvantages associated with gluing and mechanical or magnetic fixing devices. This noise reducing tool includes a flexible pad made of a metal back sheet with a vibration damping sheet adhered to it and having an air seal surrounding the damping sheet such that the pad is held against the panel by action of a vacuum intermediate the damping sheet and the panel.

17 Claims, 3 Drawing Sheets

NOISE REDUCING TOOL AND METHOD

BACKGROUND OF THE INVENTION

This invention relates to the reduction of noise through the damping of vibrations of panels including sheet metal during manufacturing operations such as while drilling and riveting on such panels.

Such vibrations are commonly associated with metal works in industry such as in the aircraft industry. Those vibrations radiate noise which produce injurious effects for the workmen and in many cases eventually impair their hearing.

Various systems and devices have been proposed to dampen vibrations of panels and metal sheets. Such known devices are held against the vibrating sheets or panels either by magnetic force, by mechanical means, or by adhesive.

SUMMARY OF THE INVENTION

It is a general object of the present invention to provide a vibration damping device that effectively reduces the radiated noise of vibrating sheets or panels during manufacturing operations on them.

It is an object of the present invention to provide a vibration damping device that attaches to the vibrating sheet or panel with a method of application that avoids the disadvantages associated with adhesives, mechanical and magnetic fixing devices.

It is another object of the present invention to provide a noise reducing tool that is readily attached and removed from a vibrating panel including a sheet material subject to vibrations radiating noise, and this, without altering or interfering with the integrity of the metal sheets or skins as is particularly important in the aircraft industry.

It is a further object of the present invention to provide a noise reducing tool that is readily flexible and holds against a sheet or panel with uniform pressure across its whole surface even on a curved surface.

It is an important object of the present invention to provide a noise reducing tool that holds against a sheet or panel under the action of vacuum while taking advantage of the counter balancing effect of atmospheric pressure thus preventing any deformation caused by an unbalanced force or pressure.

BRIEF DESCRIPTION OF THE DRAWINGS

The above and other objects and advantages of the present invention will be better understood with reference to the accompanying drawings, in which.

DETAILED DESCRIPTION OF THE DRAWINGS

Figure 1:
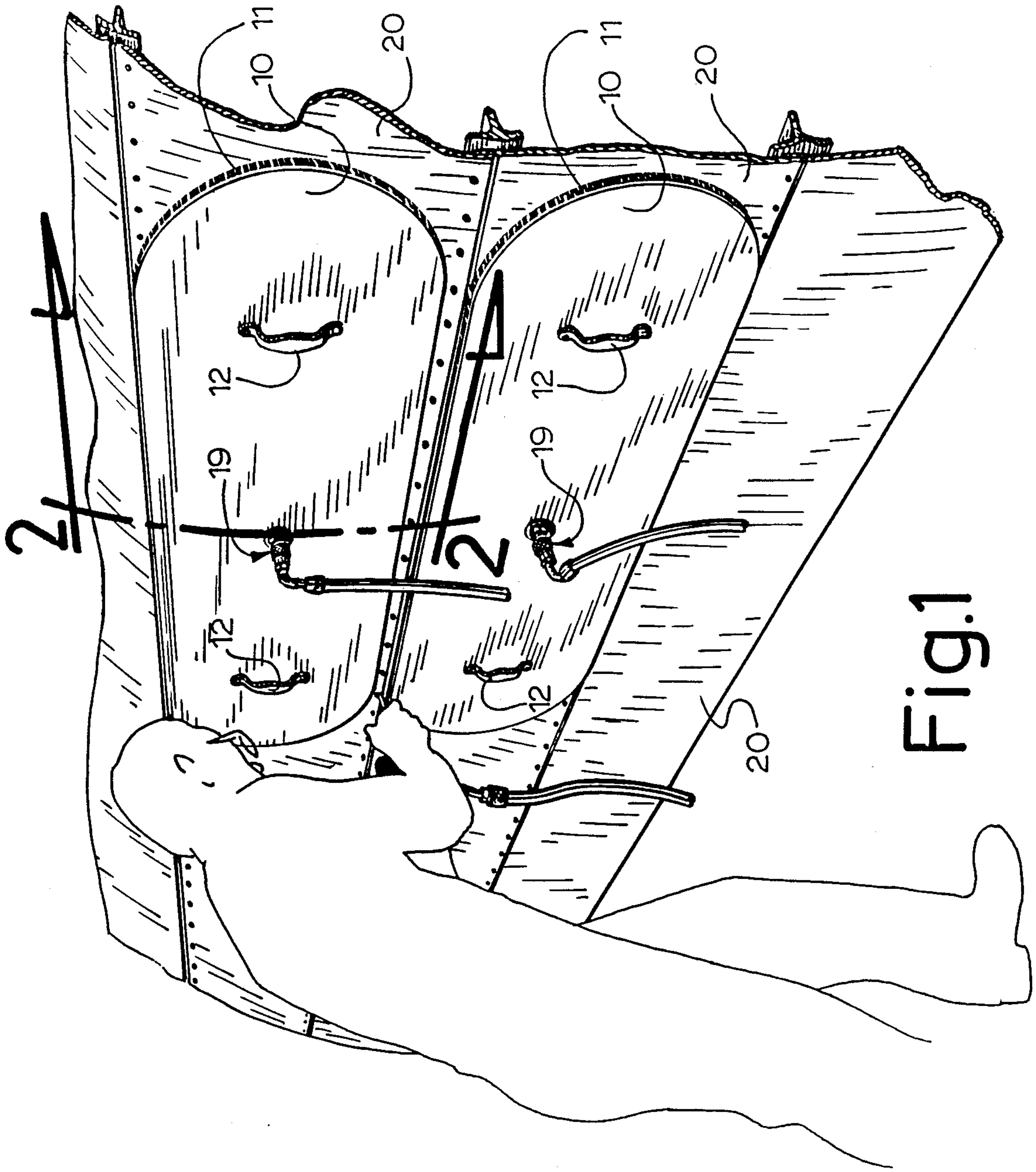
FIG. 1 is a perspective view of an aircraft panel with noise reducing tools applied to the metal skin thereof during a riveting operation.

The illustrated vacuum noise reducing tool constitutes a pad including a backing sheet 10 of flexible metal having an air seal strip 11 adhering to one face of the backing plate along its full periphery. The backing sheet 10 may be made of aluminum. A standard air impervious weather strip having an auto adhesive face constitutes the air seal strip 11. The back sheet is elongated with generally circular ends. A pair of handles 12 of any convenient type are fixed against the outward face of the back sheet 10, on the opposite face relative to the seal strip 11. Standard metal drawer handles may constitute the handles 12.

A vibration damping sheet 13 is fixed against the inward face of the back sheet 10 such as with adhesive. The damping sheet may be made of a polyurethane material or the like, such as the polyurethane sold by Cargill under the trademark Rhino Hyde. The thickness of the damping sheet 13 is selected in relation with the flexibility and the damping requirements and depending on the choice of damping materials. The seal strip 11 is thicker than the damping sheet 13 and in operation it compresses under the force produced by the vacuum on the inward face of the pad, as will be better explained later. The air seal strip 11 extends along the full periphery of the back sheet 10 and thus forms a relatively air tight boundary around it. The damping sheet 13 extends short of the boundary defined by the peripheral seal strip such that the latter is spaced around and relative to the damping sheet 13 to form a peripheral air gap 14 around it.

The damping sheet 13 is transversely cut at 15 and thus forms a transverse gap or channel communicating at its opposite ends with opposite sides of the peripheral gap 14. The gap 15 extends centrally of the vibration damping pad where a vacuum outlet is provided. The vacuum outlet includes a machined fitting 16 extending through a center hole through the pad and secured in place by a retaining nut 17. A vacuum line connector 18 of the quick disconnect type is tightly screwed to the machine fitting 16 and projects outward from the pad to connect a vacuum line 19 to it. The back sheet 10 and the damping sheet 13 constitute an outer layer and an inner layer respectively of the pad. The damping sheet may have its inner face shaped or molded with grooves, channels, or the like that could either replace or supplement the gaps 14 and 15 to distribute the vacuum over the inward face of the pad.

The vacuum noise reducing system includes the method of damping noise generating vibrations in a panel such as in a sheet of metal 20 while work is being done on that sheet. This method is used for instance to dampen the vibrations that are produced when drilling or riveting during the assembly of aircraft panels with metal skins. This method comprises providing a noise reducing tool in the form of a flexible vibration damping pad having a vibration damping layer or sheet, and adapted to apply vacuum to it as aforedescribed. An appropriate vacuum line connection is provided and a vacuum line is connected to it. The noise reducing tool is applied against the panel whose vibration is to be dampened while work is performed on it, and vacuum is applied through the vacuum line and the vacuum line connection against the face of the pad that is applied against the panel. The pad is thus held by vacuum against the panel and the vibration produced by the work performed on the metal sheet or skin, such as by riveting, is dissipated or dampened by the pad. The latter is moved along on the panel as the work progresses or rows of pads may be used on opposite sides of work, what could dispense with displacement of pads. The pad are preferably applied very near the area of the work on the panel to obtain maximum results. After completion of the work, the pad are readily put away by removing the vacuum.

Figure 2:
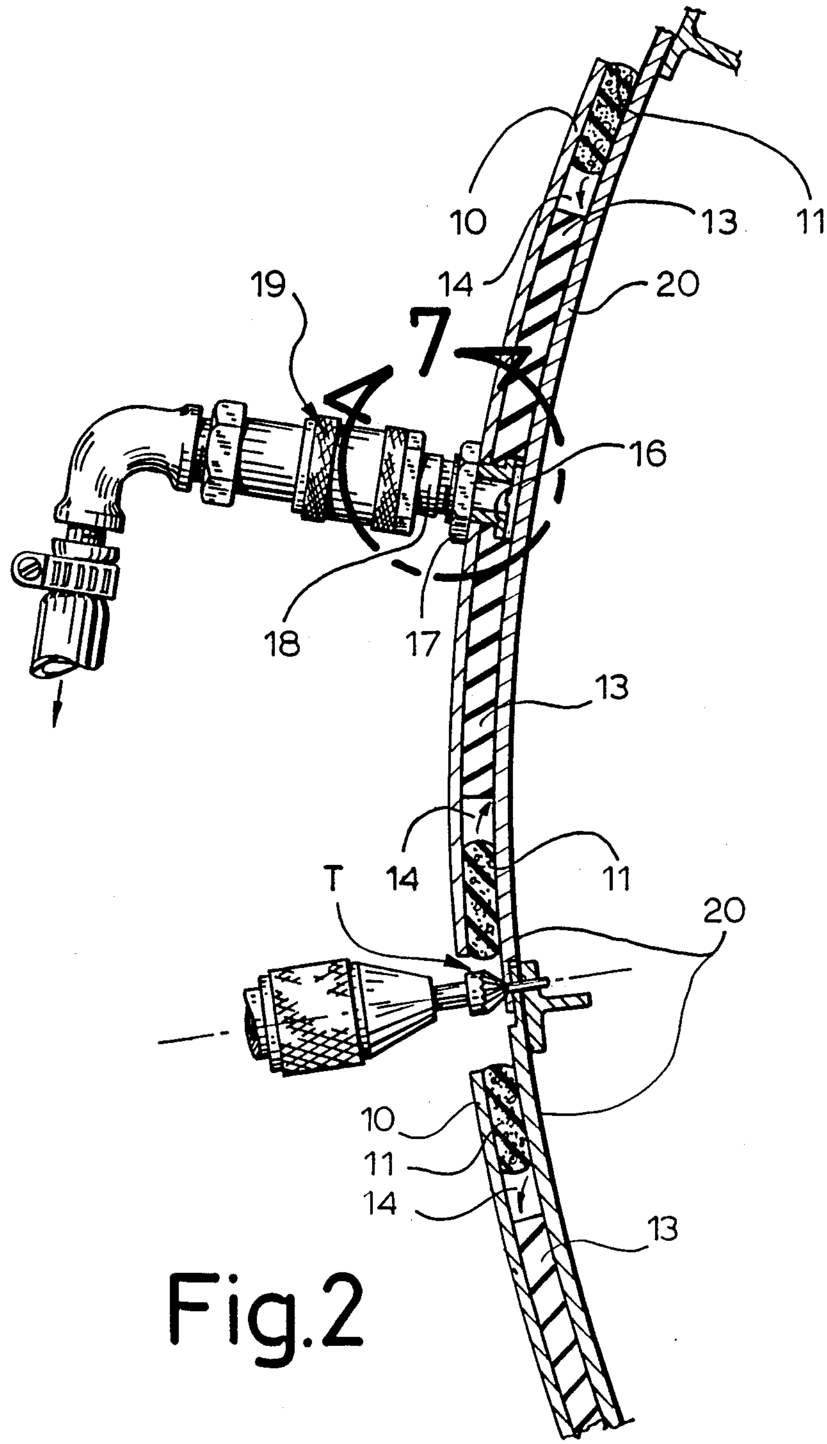
FIG. 2 is a cross-sectional view as seen along line 2—2 in FIG. 1.
Figure 3:
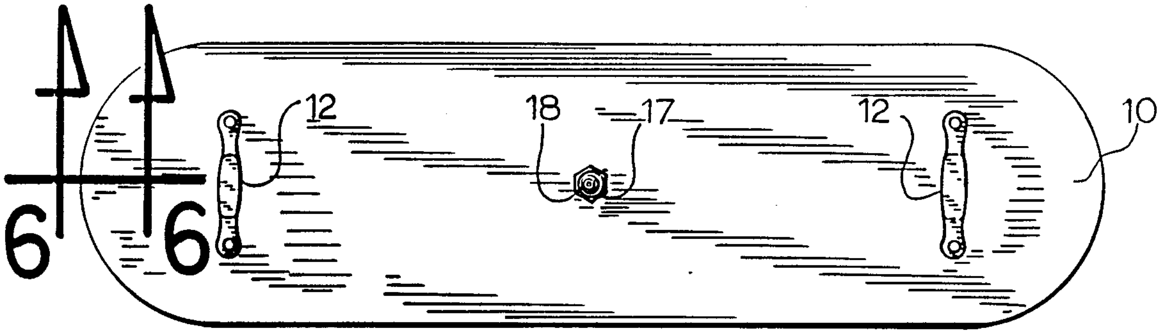
FIG. 3 is a plan view of a vacuum noise reducing tool according to the embodiment of the present invention used in FIGS. 1 and 2.
Figure 4:
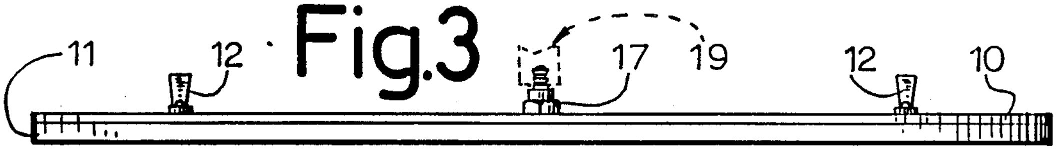
FIG. 4 is a side or edge view of the noise reducing tool of FIG. 3.
Figure 5:
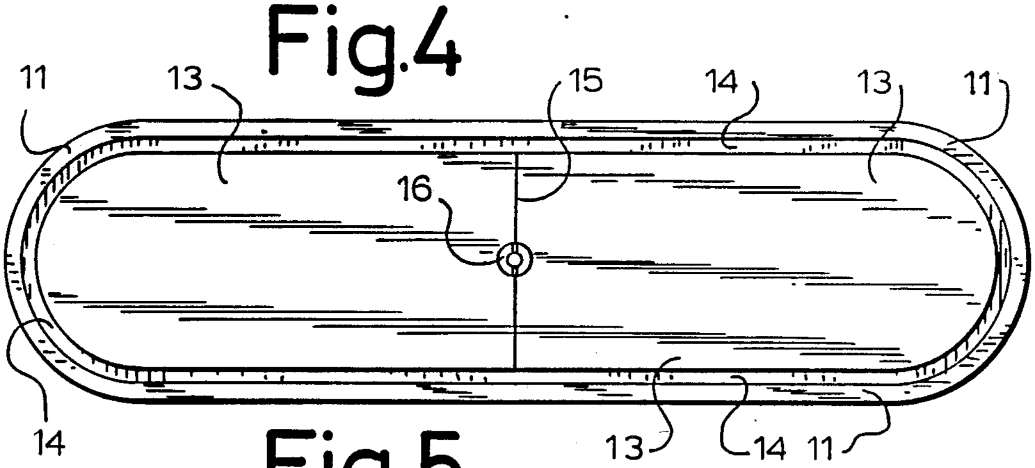
FIG. 5 is a plan view of the same vacuum noise reducing tool as seen from the opposite side relative to FIG. 3.
Figure 6:
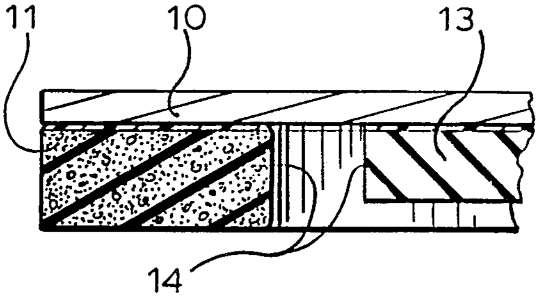
FIG. 6 is a cross sectional view as seen along line 6—6 in FIG. 3.
Figure 7:
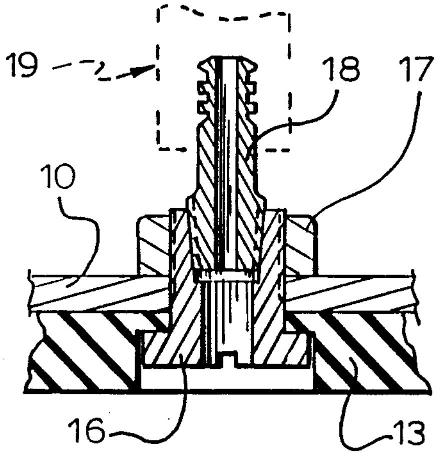
FIG. 7 is an enlarged cross sectional view as seen at 7 in FIG. 2.

As shown in FIGS. 1 and 2, the method preferably includes placing a pair of damping tools or pads on opposite sides of the riveting line or area where the tool T is being used. It has also been noted that positioning two or more damping pads in a row and lengthwise of longitudinal sheets or panels is particularly efficient to reduce the sound level caused by riveting, drilling, or the like.

I claim:

1. A vacuum noise reducing tool to attenuate vibrations in a panel or sheet while performing work thereon, comprising:

a substantially flexible vibration damping pad, defining an inward face and an outward face, peripheral air seal means provided around the vibration damping pad, projecting from and forming a closed boundary around the inward face of the vibration damping pad, and vacuum outlet means outwardly extending through the vibration damping pad with the vibration damping pad being constructed and arranged whereby application of vacuum to the vacuum outlet produces a vacuum against the inward face inside the boundary thereof and forces engagement of the vibration damping pad against the panel or sheet thereby operatively damping vibrations produced upon working on the sheet material.

2. A vacuum noise reducing tool as defined in claim 1, wherein the flexible vibration damping pad includes an outer supporting layer and an inner noise reducing layer.

3. A vacuum noise reducing tool as defined in claim 2, wherein the inner sound damping layer extends inward of the boundary defined by the peripheral air seal means.

4. Vacuum noise reducing tool as defined in claim 3, wherein the peripheral air seal means includes an air impervious seal strip fixed along and peripherally coextensive with the peripheral edge of the outer supporting layer and extending around the inner sound damping layer from the peripheral edge thereof and cooperatively forming therewith a peripheral air gap.

5. A vacuum noise reducing tool as defined in claim 4, wherein the air seal strip is compressible and thicker than the inner sound damping layer and is constructed and arranged to compress upon operative action of vacuum resulting in a compressive force on the air seal strip.

6. A vacuum noise reducing tool as defined in claim 5, wherein the outer supporting layer constitutes a flexible metal back sheet and the inner sound damping layer constitutes a sheet of vibration damping material adhered against the flexible metal back sheet on the same side of the flexible metal back sheet relative to the air seal strip.

7. A vacuum noise reducing tool as defined in claim 6, wherein the vacuum outlet means includes a vacuum line connector tightly connected to the flexible metal sheet for connection of a vacuum line thereto and the inner sound damping sheet includes air channels operatively interconnecting the vacuum line connector and the peripheral air gap.

8. A vacuum noise reducing tool as defined in claim 7, further including a pair of handles secured against the outer face of the metal back sheet.

9. A method of damping vibrations in a panel or sheet while performing work thereon comprising the steps of:

providing a noise reducing tool with appropriate vacuum line connection and an air seal to allow creating a vacuum against one face of the noise reducing tool, wherein said noise reducing tool comprises a flexible sound damping pad, applying the noise reducing tool against an area of the panel or sheet adjacent to where work is to be performed with said one face facing the panel or sheet, to perform work on the panel or sheet, applying vacuum between said one face and the panel or sheet through the vacuum line connection while work is performed on the panel or sheet, and removing the vacuum and the noise reducing tool after completion of the work on the panel or sheet whereby vibrations induced by the work are dissipated by the noise reducing tool.

10. A method of damping vibrations as defined in claim 9, wherein at least one pair of sound damping pads are positioned on opposite sides respectively of the area to work thereon and are selectively removed and repositioned in relation to changes in the position of the area to work thereon.

11. A method of damping vibrations as defined in claim 10, wherein a row of at least two sound damping pads is positioned on either side of the area of said panel or sheet where work is to be performed such as by riveting or drilling.

12. A noise reducing tool for atttenuating vibrations produced in a panel or sheet as work is being performed thereon, comprising:

(a) a flexible, substantially planar vibration damping pad, said pad having an inner face, an outer face and a periphery;

(b) means for providing a substantially airtight seal between said noise reducing tool and said panel or sheet, said seal means being attached to the inner face of said damping pad around the periphery of said damping pad;

(c) a vacuum outlet passing from the outer face to the inner face of said damping pad for conveying a vacuum to the inner face of said damping pad and thereby adhering said damping pad to said panel or sheet as work is being performed on said panel or sheet.

13. The noise reducing tool of claim 12, wherein said tool further comprises:

(d) a noise reducing layer affixed to the inner face of said damping pad, said noise reducing layer disposed within said seal means.

14. The noise reducing tool of claim 12, wherein said seal means comprises a compressible strip of substantially air-impervious material, said compressible strip being thicker than said noise reducing layer, whereby said vacuum acting between said damping pad and said panel or sheet compresses said compressible strip and brings said damping pad and said panel or sheet into closer proximity.

15. The noise reducing tool of claim 14, wherein said noise reducing layer is not in contact with said compressible strip, whereby an air gap exists between said noise reducing layer and said compressible strip around said noise reducing layer.

16. The noise reducing tool of claim 12 further comprising a pair of handles, said handles being fastened to the outer face of said damping pad.

17. The noise reducing tool of claim 12, wherein said vacuum outlet further includes a vacuum line connector affixed to the portion of said vacuum outlet adjacent to the outer face of said damping pad, whereby a vacuum line for conveying vacuum to the space between the inner face of said damping pad and said panel or sheet may be operatively connected to said vacuum outlet.

* * * * *